(12) United States Patent
De Sousa et al.

(10) Patent No.: US 12,172,527 B2
(45) Date of Patent: Dec. 24, 2024

(54) RECTIFIER BASED POWER SWITCH

(71) Applicant: McLaren Applied Limited, Woking (GB)

(72) Inventors: Luis Manuel De Sousa, Woking (GB); Georgios C. Christidis, Woking (GB); Anastasios Nanakos, Woking (GB)

(73) Assignee: McLaren Applied Limited, Woking (GB)

( * ) Notice: Subject to any disclaimer, the term of this patent is extended or adjusted under 35 U.S.C. 154(b) by 225 days.

(21) Appl. No.: 17/295,807

(22) PCT Filed: Nov. 21, 2019

(86) PCT No.: PCT/GB2019/053293
§ 371 (c)(1),
(2) Date: May 20, 2021

(87) PCT Pub. No.: WO2020/104803
PCT Pub. Date: May 28, 2020

(65) Prior Publication Data
US 2022/0024321 A1  Jan. 27, 2022

(30) Foreign Application Priority Data
Nov. 21, 2018  (GB) .................................. 1818980.3

(51) Int. Cl.
*B60L 15/00* (2006.01)
*H02M 1/32* (2007.01)
(Continued)

(52) U.S. Cl.
CPC ............ *B60L 15/007* (2013.01); *H02M 7/003* (2013.01); *H02M 7/5387* (2013.01); *H02P 27/06* (2013.01); *H02M 1/32* (2013.01); *H02P 5/74* (2013.01)

(58) Field of Classification Search
CPC ...... B60L 15/007; H02M 7/5387; H02P 27/06
(Continued)

(56) References Cited

U.S. PATENT DOCUMENTS

2002/0131276 A1  9/2002  Katoh et al.
2005/0259402 A1  11/2005  Yasui et al.
(Continued)

FOREIGN PATENT DOCUMENTS

CN  104272575  1/2015
CN  106953516  7/2017
(Continued)

OTHER PUBLICATIONS

Office Action in European Appln. No. 19809601.8, dated Jan. 3, 2023, 7 pages.
(Continued)

*Primary Examiner* — Kawing Chan
(74) *Attorney, Agent, or Firm* — Fish & Richardson P.C.

(57) ABSTRACT

A power conversion mechanism configured to interface between an electric energy store and an electric machine, comprising: an electronic switching device comprising a first plurality of power modules and configured to control the direction of current flow between the electric energy store and the electric machine to either a first direction or a second direction opposing the first direction; and a power inverter comprising a second plurality of power modules and configured to commutate the current flow between the electric energy store and the electric machine; wherein each power module of the electronic switching device and the power inverter comprises an identical arrangement of power components.

22 Claims, 4 Drawing Sheets

(51) Int. Cl.
    *H02M 7/00*       (2006.01)
    *H02M 7/5387*     (2007.01)
    *H02P 5/74*       (2006.01)
    *H02P 27/06*      (2006.01)

(58) Field of Classification Search
    USPC .......................................................... 318/504
    See application file for complete search history.

(56) References Cited

U.S. PATENT DOCUMENTS

| | | | |
|---|---|---|---|
| 2013/0257328 A1 | 10/2013 | Arai et al. | |
| 2016/0257207 A1 | 9/2016 | Suzuki et al. | |
| 2016/0368385 A1 | 12/2016 | Yim et al. | |
| 2016/0380448 A1 | 12/2016 | Seo et al. | |
| 2017/0197511 A1* | 7/2017 | Yonak | B60L 50/61 |
| 2018/0309357 A1 | 10/2018 | Dib et al. | |
| 2019/0149145 A1* | 5/2019 | Yang | H02M 3/155 318/139 |
| 2021/0184557 A1* | 6/2021 | Nishibata | H02M 1/32 |

FOREIGN PATENT DOCUMENTS

| | | | |
|---|---|---|---|
| CN | 107946676 A | * | 4/2018 |
| EP | 1306262 A2 | | 5/2003 |
| EP | 2197084 A1 | | 6/2010 |
| EP | 2602904 A1 | | 6/2013 |
| EP | 2685494 A1 | | 1/2014 |
| EP | 3012966 | | 4/2016 |
| JP | H10-248237 | | 9/1998 |
| JP | 2006-081309 | | 3/2006 |
| JP | 2008-312396 | | 12/2008 |
| JP | 2017-222203 | | 12/2017 |
| JP | 2018-042431 | | 3/2018 |
| WO | WO 2015/139132 | | 9/2015 |

OTHER PUBLICATIONS

Authorized Officer, Gareth John; Search Report dated May 15, 2019 in Application No. GB1818980.3, 2 pages.

Authorized Officer, Nathalie Duperron; International Search Report and Written Opinion dated Mar. 10, 2020 in Application No. PCT/GB2019/053293, 14 pages.

Office Action in Japanese Appln. No. 2021-528889, mailed Nov. 21, 2023, 6 pages.

Office Action in Chinese Appln. No. 201980087085, mailed on Jul. 31, 2024, 45 pages (with Machine Translation).

Eu.mouser.com [online], "Subject to change without notice m[ohm] All-Silicon Carbide Half-Bridge Module C2M MOSFET and Z-Rec Diode PartNumber PackageMarking CAS120M12BM2Half-BridgeCAS120312BM2," Dec. 30, 2024, retrieved on Sep. 12, 2024, retrieved from URL<https://eu.mouser.com/datasheet/2/90/as120m12bm2-838593.pdf>, 10 pages.

Office Action in European Appln. No. 19809601.8, mailed Sep. 6, 2024, 11 pages.

Vishay.com [online], "SQ1440EH Automotive N-Channel 60 V (D-S) 175 MOSFET," Nov. 16, 2015, retrieved on Sep. 12, 2024, retrieved from URL<www.vishay.com/docs/65884/sq1440eh.pdf>, 10 pages.

Vishay.com [online], "SQJ202EP Automotive Dual N-Channel 12 V (D-S) 175 MOSFETs," Oct. 19, 2015, retrieved on Sep. 12, 2024, retrieved from URL<:https://www.vishay.com/docs/62926/sqj202ep.pdf>, 12 pages.

* cited by examiner

RECTIFIER BASED POWER SWITCH

CROSS-REFERENCE TO RELATED APPLICATIONS

This application is a National Stage Application under 35 U.S.C. § 371 and claims the benefit of International Application No. PCT/GB2019/053293, filed Nov. 21, 2019, which is the country equivalent to GB Patent Application No. 1818980.3, filed on Nov. 21, 2018. The disclosure of each of the foregoing applications is incorporated herein by reference.

This invention relates to a power conversion mechanism, and in particular the power conversion mechanism for an Energy Recovery System.

Modern-day racing vehicles are commonly equipped with Kinetic Energy Recovery Systems (KERS). These systems convert kinetic energy recovered from the brakes of the vehicle during deceleration into electrical energy and store this energy in an electric energy store, such as a battery, for later use under acceleration. Following the invention of the KER system, a more specialised Energy Recovery System (ERS) was developed combining the kinetic energy recovery mechanism from the KER system with a recovery system for heat energy. An ERS comprises two motor generator units, a kinetic energy unit (MGU-K) and a heat energy unit (MGU-H). When the brakes are applied during racing conditions, the MGU-K coverts kinetic energy into electricity for storage within the electric energy store. This unit also acts as a motor whilst the vehicle is accelerating, providing power from the energy store to the drivetrain. The MGU-H is connected to the turbocharger of the vehicle's engine and converts heat energy received from the exhaust gases into electrical energy. By recovering electrical energy from two distinct sources, the ERS is able to provide significantly more harvested power to the drivetrain of the vehicle than a KER system, providing a significant advantage.

In addition to the two motor generator units, a conventional ERS further comprises one or more input capacitors for accumulating obtained energy and one or more electrically controlled switches, such as a contactor, to remotely connect or disconnect the electric energy store to or from the motor generator units. The switches can therefore actuate the switching between different power unit settings as requested by the driver of the vehicle. The energy store should only be connected to the generator units once a sufficiently large energy amount has been collected from the units, to prevent arcing and subsequent damage to the contactors. To ensure that the input capacitor is sufficiently charged before the contactor is closed, a pre-charge system is provided. This system is positioned in parallel to the input contactor of the ERS, and is commonly composed a second, smaller contactor that is arranged in series with a resistor. However, it is possible that this second contactor may not have the sufficient breaking capacity to short-circuit the current away from the main contactor. A fuse must therefore be used to ensure that the necessary breaking capacity is met and to avoid a catastrophic short circuit of the system.

In addition to the abovementioned disadvantage, an additional issue associated with the layout of a conventional ERS is that the electrical contactors used to connect the battery system to the electric drive are associated with both significant weight and size characteristics. Furthermore, due to their larger size, the contactors are difficult to implement within the electrical circuitry of the ERS. These attributes are not desirable for components to be used in a racing vehicle, in which performance is substantially tied to overall weight and size.

There is a need for an alternative arrangement of an ERS, incorporating improved electrical characteristics and reduced weight and size characteristics over existing systems.

SUMMARY OF INVENTION

According to a first aspect of the invention there is provided a power conversion mechanism configured to interface between an electric energy store and an electric machine, comprising; an electronic switching device comprising a first plurality of power modules and configured to control the direction of current flow between the electric energy store and the electric machine to either a first direction or a second direction opposing the first direction; and a power inverter comprising a second plurality of power modules and configured to commutate the current flow between the electric energy store and the electric machine; wherein each power module of the electronic switching device and the power inverter comprises an identical arrangement of power components.

Each power module of the electronic switching device and the power inverter may comprise two power semiconductor switches arranged in a half-bridge configuration.

The power semiconductor switches may be insulated-gate bipolar transistors.

The power semiconductor switches may be metal-oxide-semiconductor field-effect transistors.

Each insulated-gate bipolar transistor may be placed in an anti-parallel configuration with a corresponding diode.

The electronic switching device may comprise two power modules.

The power inverter may comprise three power modules.

The power modules of the switching device may be arranged in a parallel configuration and the power modules of the power inverter may be arranged in a parallel configuration The power conversion mechanism may comprise a first power inverter and a second power inverter, wherein the two power inverters comprise the same configuration of power modules.

The power conversion mechanism may further comprise a first driver board, a second driver board and a cooling system configured to interface with one or more power modules; wherein both the electronic switching device and the one or more power inverters are electrically coupled to the first driver board, the second driver board and the cooling system.

The power modules of the power conversion mechanism may be arranged into two distinct rows of power modules, wherein a cooling device is arranged horizontally and between the planar surfaces of two adjacent rows of power modules.

The arrangement of the power modules and corresponding mutual components may be configured in a substantially planar configuration.

The first row of power modules may comprise the three power modules of the first power inverter and a first power module of the electronic switching device; and the second row of power modules may comprise three power modules from the second power inverter and a second power module of the electronic switching device.

One or more power modules may comprise a current controlling mechanism configured to control the current supplied to the power module.

The current controlling mechanism may comprise a capacitor.

The amount of current passing through the electronic switching device may be different when the current is flowing in the first direction to the current flowing in the second direction.

The electronic switching device may be further configured to control the polarity of voltage through the electronic switching device between a positive voltage value and a negative voltage value.

The electric energy store may be a battery.

The electric machine may be a motor generator unit.

According to a second aspect of the invention there is provided a vehicle comprising an electric energy store, a mechanism configured to interface an electric energy store and a power conversion mechanism configured to interface the electric energy store and the electric machine, wherein the power conversion mechanism comprises; an electronic switching device comprising a first plurality of power modules and configured to control the direction of current flow between the electric energy store and the electric machine to either a first direction or a second direction opposing the first direction; and a power inverter comprising a second plurality of power modules and configured to commutate the current flow between the electric energy store and the electric machine; wherein each power module of the electronic switching device and the power inverter comprises an identical arrangement of power components.

The present invention will now be described by way of example with reference to the drawings. In the drawings.

DETAILED DESCRIPTION

Figure 1:
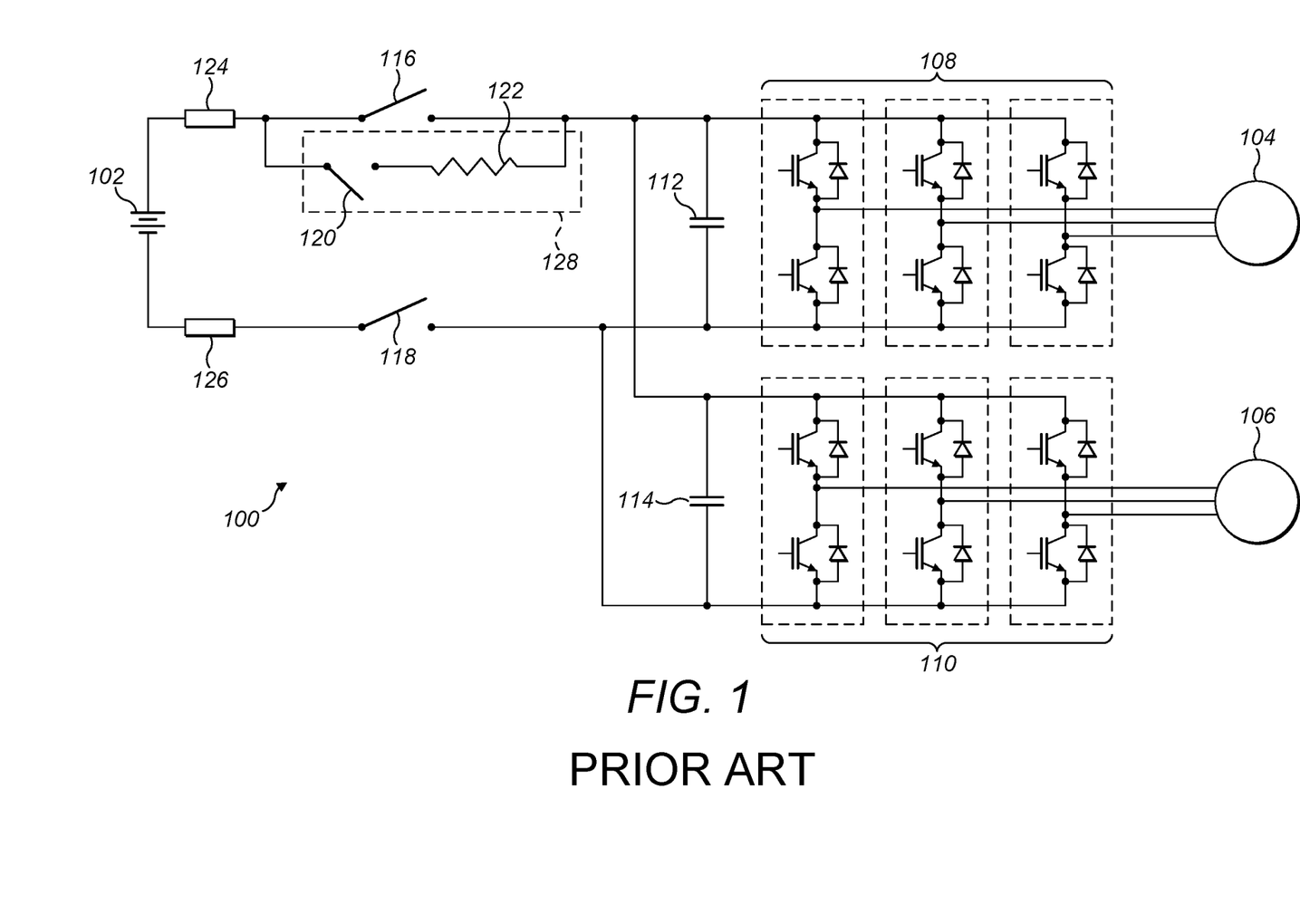
FIG. 1 shows the layout for a conventional ERS.

FIG. 1 shows the arrangement of a conventional ERS 100 comprising an electric energy store 102, a first motor generator unit 104 and a second motor generator unit 106, each motor generator unit being electrically coupled to a corresponding inverter 108, 110 and an input capacitor 112, 114. Both motor generator units 104, 106 are electrically coupled at a first end to the positive terminal of the electric energy store 102, and at a second end to the negative terminal of the electric energy store 102. The system further comprises a first contactor 116 arranged between the positive terminal of the electric energy store 102 and the inverters 108, 110, and a second contactor 118 arranged between the negative terminals of the electric energy store 102 and the inverters 108, 110. A third contactor 120 is arranged in parallel with the first contactor 116, and in series with an electrical resistor 122. An electrical fuse 124, 126 is located adjacent to a first end and a second end of the electric energy store 102 respectively.

In the configuration depicted in FIG. 1, the first contactor 116 is used to remotely connect or disconnect the electric energy store 102 to or from the motor generator units 104, 106. First contactor 116 is electrically coupled to a controller (not shown), to stimulate the opening or closing of the contactor 116 in dependence on an external request. The external request may be initiated by the driver of the vehicle, or alternatively by either vehicle or environmental conditions. The second contactor is provided to enable complete isolation of the electric energy store 102 from the motor generator units 104, 106. This allows an operator to access the motor generator units 104, 106 without the risk of contact with the live electricity supply during servicing of the system, for example. The third contactor 120 and electrical resistor 122 together form a pre-charge system 128. This system allows for a small quantity of current to flow before the first contactor 116 is closed, mitigating the excessive charge to be dispelled by the capacitors 112, 114 when the motor generator units 104, 106 are connected to the electrical energy store 102.

As previously mentioned, the conventional ERS layout is associated with problems such as the inability of the third contactor 120 of the pre-charge system 128 to redirect current away from the electric energy store 102 without the use of an additional fuse. In addition to this, the system is associated with considerable size and weight characteristics due to the number and location of components required to prevent arcing and subsequent damage to switching components.

Figure 2:
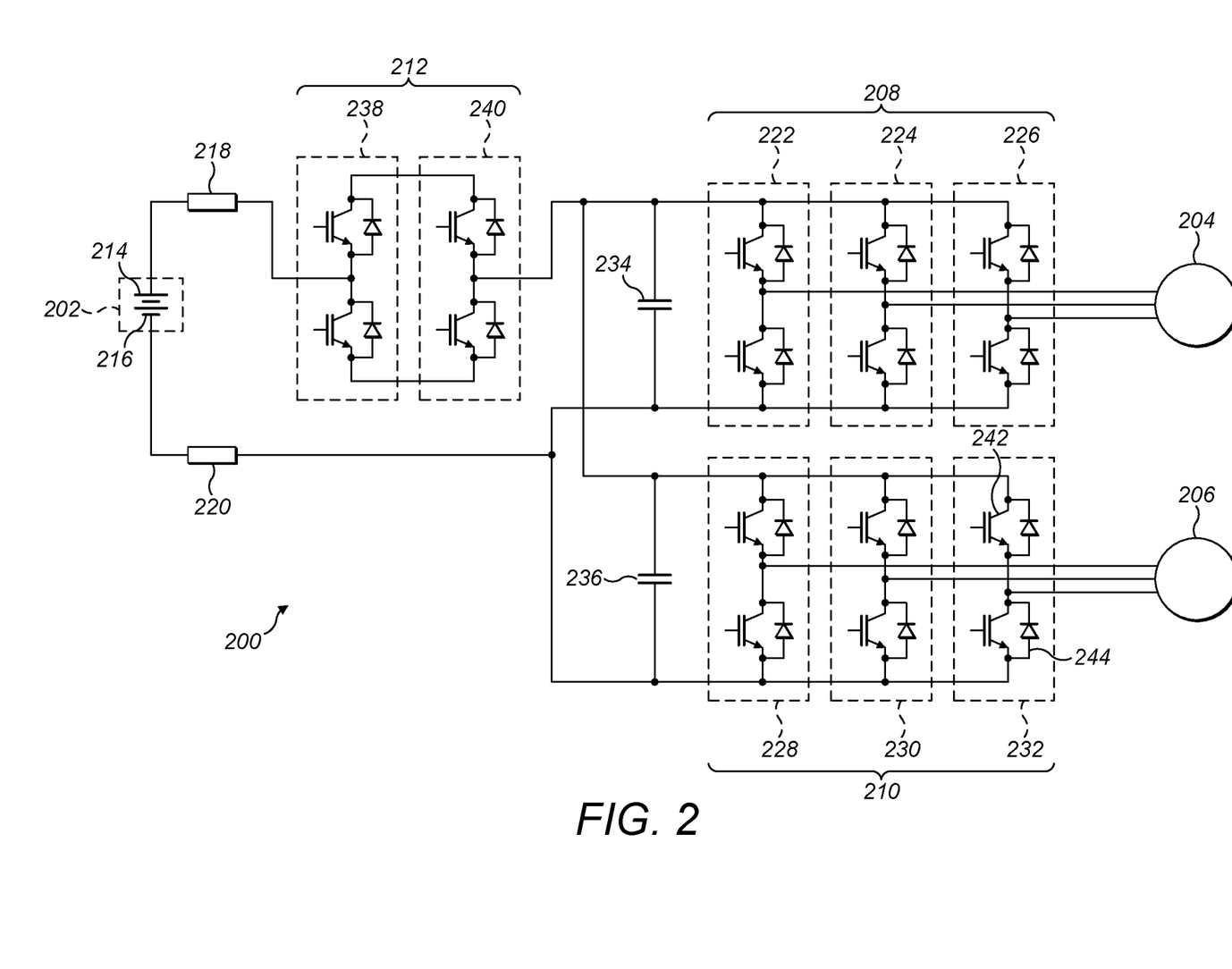
FIG. 2 shows a circuit diagram for an improved ERS.

FIG. 2 shows the electrical arrangement of components in the improved ERS 200. As with the conventional ERS, this system comprises electric energy store 202, a first motor generator unit 204, a second motor generator unit 206, a first inverter 208 and a second inverter 210. The first inverter 208 is electrically coupled to the first motor generator unit 204 at its first end, and to the electric energy store 202 at its second end. The second inverter 210 is electrically coupled to the second motor generator unit 206 at its first end, and to the electric energy store 202 at its second end. The system additionally comprises a switching device 212 to remotely connect or disconnect the electric energy store 202 to or from the motor generator units 204, 206.

The electric energy store 202 is traditionally provided to supply electrical energy to the one or more of the motor generator units 204, 206 of a vehicle. In an ERS, the electric energy store 202 is additionally provided to receive electrical current supplied by the one or more motor generator units 204, 206. The storage device 202 may be a battery. The battery of motor vehicle may comprise any number of cells. In one embodiment of the invention, as shown in FIG. 2, the battery comprises two cells 214, 216 arranged in series. In another embodiment of the invention, the electric energy store may be a supercapacitor. In an alternative embodiment of the invention the ERS may comprise a mechanical storage device, such as a flywheel.

The electric energy store 202 is electrically coupled to one or more electrical safety devices 218, 220. Such safety devices are provided to prevent the flow of excessive current through the ERS. The one or more electrical safety devices 218, 220 is located adjacent to the electric energy store 202, either interfacing with the positive terminal or the negative terminal of the device. In one embodiment of the invention, an electrical safety device may be provided adjacent to both the positive terminal and the negative terminal of the storage device 202. In a preferred embodiment of the invention, the one or more electrical safety devices 218, 220 is a fuse.

The ERS comprises one or more motor generator units for exchanging energy with the electric energy store. In a preferred embodiment of the invention the vehicle comprises two motor generator units 204, 206. In this embodiment, the first motor generator unit 204 may be configured to convert kinetic energy into electrical energy. Kinetic energy may be provided from the brakes of the vehicle. Alternatively, kinetic energy may be provided from any moveable component of the vehicle. Additionally, the second motor generator unit 206 may be configured to covert heat energy into electrical energy. Heat energy may be provided from the turbocharger of the vehicle's engine. Alternatively, heat energy may be provided from any heated component of the vehicle.

In an alternative embodiment of the invention the ERS may comprise one motor generator unit. In this embodiment the motor generator unit may be configured to convert kinetic energy into electrical energy. In alternative embodiments of the invention the ERS may comprise more than two motor generator units.

In FIG. 2, each motor generator unit 204, 206 of the ERS 200 is electrically coupled to a corresponding inverter 208, 210. The inverters 208, 210 are configured to transform the current flowing between the electric energy store 202 and its corresponding motor generator unit between a direct current into an alternating current. Specifically, current flowing between the electric energy store 202 and the inverters 208, 210 is direct current. Current flowing between the motor generator units 204, 206 and their corresponding inverters 208, 210 is alternating current. In a preferred embodiment of the invention the inverters 208, 210 are three-phase inverters comprising a parallel arrangement of three power modules 222, 224, 226 and 228, 230, 232. A three-phase inverter is advantageous as it is more energy efficient, smaller in size compared to other inverters and is able to self-start. However, the inverters can be extended to include any number of power modules.

In FIG. 2, each inverter 208, 210 comprises three power modules that are electrically coupled to each other. Each power module is electrically coupled to a different load terminal of the motor generator unit (not shown). Furthermore, each power module comprises an identical arrangement of power components. In a preferred embodiment of the invention, each power module is arranged in a half bridge configuration. This half bridge configuration allows for the bidirectional flow of current. If the current flows in a first direction, electrical energy can be supplied to one or more of the motor generator units 204, 206 from the electric energy store 202. If current flows in a second direction, electrical energy can be supplied to the electric energy store 202 from one or more of the motor generator units 204, 206. The bidirectional current may be varied between +/−400A. Additionally, the blocking voltage, or the maximum voltage that can be applied across the power components, is bidirectional in nature. The bidirectional voltage may be varied between +/−1200V. Each inverter 208, 210 may be electrically coupled to a control unit for providing control to its power modules. The inverters 208, 210 may be coupled to a mutual control unit. Alternatively, each inverter 208, 210 may be coupled to a separate control unit.

The arrangement of power components within each power module 222, 224, 226, 228, 230, 232 of the inverters 208, 210 may comprise two simple on-off electrical switches that are electrically coupled to each other and are positioned on either side of the coupling between the power module and the motor generator unit. In a preferred embodiment of the invention each power module comprises two transistors that are electrically coupled to each other and are positioned on either side of the electrical coupling between the power module and the motor generator unit. In one embodiment of the invention the transistors are insulated gate bipolar transistors (IGBTs). Such transistors are advantageous for use in inverter mechanisms due to their capability of handling high voltage and current characteristics. In an alternative embodiment of the invention the transistors are metal-oxide-semiconductor field-effect transistors (MOSFETs). Each transistor may be electrically coupled to a diode that is located in an anti-parallel position and between the terminals of the transistor. Such a diode is referred to as a fly back (or "freewheeling") diode and is arranged to allow for the conduction of current in a direction opposing the first direction of current flow.

Each inverter 208, 210 of the ERS is additionally coupled to a corresponding capacitor 234, 236. Each capacitor 234, 236 is configured to receive and store electrical energy recovered by its corresponding motor generator unit 204, 206. Electrical energy is stored in the capacitors 234, 236 and is fed to the electric energy store 202. Additionally, each inverter 208, 210 is electrically coupled to a controller (not shown) allowing for remote control of the inverters, and consequently the motor generators, to be established. First inverter 208 may be electrically coupled to a first controller. Second inverter 210 may be electrically coupled to a second controller. First and second inverters 208, 210 may be coupled to a mutual controller.

The ERS 200 further comprises a switching device 212 for alternating the flow of current so that electrical energy is either passed from the motor generator units 204, 206 to the electric storage device 202 or alternatively from the electric storage device 202 to one or more of the motor generator units 204, 206. In FIG. 2 the switching device 212 is located such that it is adjacent to the electric energy store 202 of the ERS 200 at one end and to the one or more inverters 208, 210 of the one or more motor generator units 204, 206 at a second end opposing the first end. The switching device 212 is electrically coupled to a third controller (not pictured). In some embodiments of the invention the third controller may be the same as the first and second controllers used to control the first and second inverters.

In a preferred embodiment of the invention the switching device 212 is arranged as a solid-state relay and comprises the parallel arrangement of two power modules 238, 240 with the same arrangement of power components as that of the power modules which the inverters 208, 210 are formed. Each power module forms one half of the solid-state relay, wherein the power module closest to the electric energy store 202 forms the high side of the relay and the power module closest to the motor generator units 204, 206 forms the low side of the relay. Each power module of the switching device 212 comprises an identical arrangement of power modules to the one or more inverters 208, 210. As previously mentioned, each power module may comprises two IGBTs or two MOSFETs. Furthermore, each transistor may be electrically coupled to a diode that is located in an anti-parallel position and between the two terminals of the transistor.

Each IGBT or similar transistor of the power module is electrically coupled to a gate driver (not pictured) which converts low-power input from the controller into a high-current drive input for the gate of the transistor. An advantageous feature of this system is that the gate driver can be designed to protect against the occurrence of battery short-circuit. In one embodiment of the invention, the gate driver is designed such that the turn-on and turn-off speeds of the transistor are different. In a preferred embodiment of the invention, the gate driver is designed so that the turn-on speed of the transistor is slower than its turn-off speed. A slow turn-on speed is advantageous as it reduces the inrush current. Inrush current is experienced in conventional relay circuits where there is no control over the speed of electrical contact. In these conventional circuits there is nothing to slow down the current when an electrical power source is connected to a capacitor. This setup therefore results in a high initial current, or inrush current, which may damage the circuitry of the energy system. A faster turn-off speed is advantageous as it enables the solid-state relay to be opened whilst a high current is conducted.

One problem associated with power components such as IGBTs and similar transistors is the parasitic turn on of a device due to drain-gate capacitance. A sharp rate of change of voltage is developed between the source and the drain of the device, causing a current to flow to the gate. This causes a voltage drop across the device and an increase in the gate voltage that may result in a self-initiated turn-on of the device. To overcome this problem, each power module of the ERS may further comprise a current control mechanism to decelerate the turn-on of a switching component within the power module, and therefore to control the initial flow of current through the power module.

A system such as an ERS is vulnerable to component damage as a result of short-circuiting and destruction of either the battery or the motor generator units due to a short-circuit of a component of the ERS or an abnormal operation of the monitor generator unit, for example. To overcome this potential damage, the invention may further comprise a system for detecting short circuit of a battery. A fourth controller is used to monitor the electrical coupling between the switching device 212 and the inverters 208, 210. This controller may be the previously mentioned first controller, second controller or third controller. Alternatively, this controller may be a separate controller that does not control an additional component of the ERS. Current flowing through the section of the ERS monitored by the fourth controller is direct current. If the controller detects an abnormal rate of change of voltage, the solid-state mechanism of the switching device will start to open to terminate the flow of current. After a confirmed period of time, referred to as the blanking time, if the voltage has continued to decrease the command to open the solid-state mechanism is confirmed and current is prohibited from passing to the battery. If the voltage has not continued to decrease after the blanking time the command to open the solid-state mechanism is terminated. This system enables the protection of the battery against short-circuit of the motor generator units, and vice versa.

Figure 3:
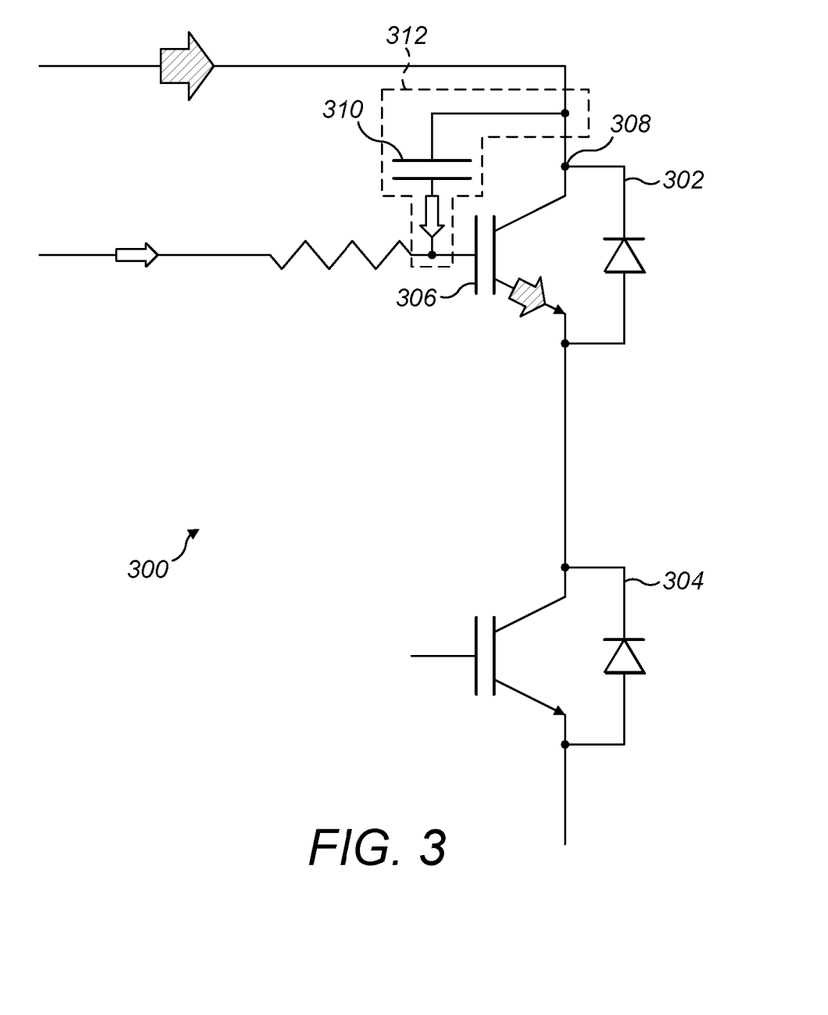
FIG. 3 shows the arrangement of a current control mechanism within a power module of the improved ERS.

FIG. 3 shows the arrangement of the current control mechanism within part of an exemplary power module 300. In this embodiment of the invention, the power module 300 comprises two power components 302, 304, and the power components are IGBTs. IGBT 302 comprises a gate 306 and a collector 308. In an alternative embodiment of the invention, where the power components are MOSFETs, the MOSFET comprises a drain in the place of the collector. Current control mechanism 312 is electrically coupled to the first IGBT 302 of the power module 300. In an alternative embodiment of the invention, the current controlling mechanism may be coupled to the second power component 304 of the power module 300. Alternatively, a current controlling mechanism may be provided for each of the power components of a given power module.

The current controlling mechanism 312 as depicted in FIG. 3 comprises a capacitor 310 arranged in parallel with the power component and is attached at a first end to the input and at a second end to the gate 306 of the switching device. This arrangement allows for introduction of a "Miller Capacitance" into the circuit, wherein the capacitor 310 is able to absorb the current flowing between the drain and the gate and therefore prohibit the initiation of parasitic turn on. It will be appreciated that, as the gate current of the IGBT 302 increases, the current across the current control mechanism increases accordingly. The current controlling mechanism 312 may also be used to slow down the initial turn-on of the power component.

Figure 4:
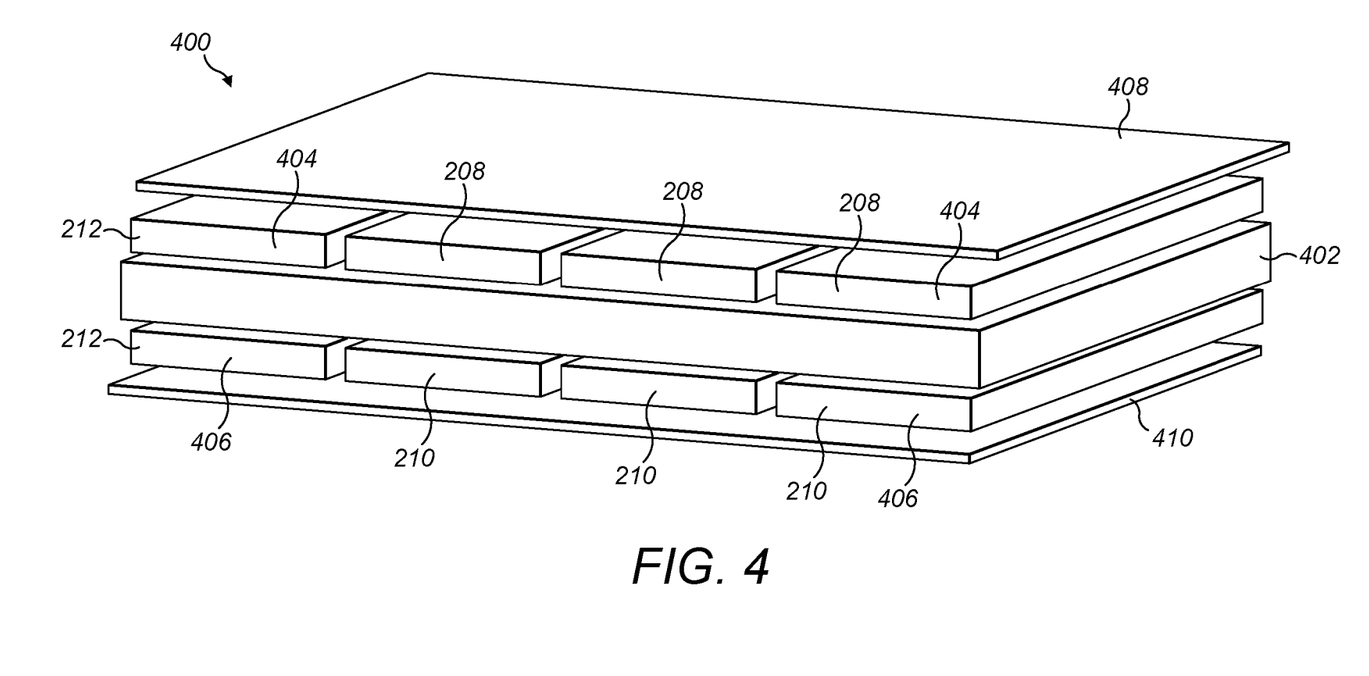
FIG. 4 shows the physical arrangement of the ERS modules and associated components.

FIG. 4 shows the physical arrangement 400 of the ERS modules and associated components. By ensuring that the switching device 212 comprises the same power modules as the inverters 208, 210, the compact mechanical integration of modules can be established. In addition to this, all modules to be electrically coupled to mutual cooling components and driver boards.

The arrangement depicted in FIG. 4 comprises an arrangement of power modules, wherein the power modules are arranged into two substantially parallel rows. In this configuration, each module of the ERS is rectangular in configuration, allowing for compact stacking of each module. Where the ERS comprises two inverters, the power modules of the first inverter 208 are located on a first row, and the power modules of the second inverter 210 are located on a second row of power modules. Where the switching module 212 comprises two of the same power modules, a first module of these power modules is located in the first row, and a second module of the power modules is located on the second row. The two power modules of the switching module 212 may be located such that they are parallel to each other in the transverse plane. In the embodiment shown in FIG. 4 the ERS comprises two three-phase inverters, each three-phase inverter comprising three power modules. However, it should be appreciated that each of these inverters may comprise any number of power modules, and that in this scenario all of the power modules of each inverter will be located adjacent to each other in their respective rows.

In an alternative embodiment of the invention, the ERS may comprise more than two inverters. In this embodiment, the power modules of the additional inverters may be situated adjacent to modules on either the first or second rows of power modules. Alternatively, the power modules of the additional inverters may be located on one or more additional rows of modules.

In FIG. 4, a cooling system 402 is located between each of the rows of power modules. The cooling system 402 is advantageously located as all power modules of the ERS have equal access to cooling. In an alternative embodiment of the invention, the cooling system may be located on the outer side of either the first row 404 or the second row 406 of power modules.

The arrangement in FIG. 4 further comprises two driver boards 408, 410 positioned horizontally and located on the outer surface of the rows of inverter modules. A first driver board 408 is located above the outer surface of the first row 404 of inverter modules, and a second driver board 410 is located below the outer surface of the second row 406 of inverter modules. First and second boards 408, 410 can be equated to the aforementioned first and second controllers, and are configured to provide control to first and second inverters 208, 210 respectively. First and second boards 408, 410 can additionally be configured to provide control to the power modules of the switching device 212. As mentioned previously, the use of similar modules for the switching device 212 and inverters 208, 210 allows for sharing of both the driver boards and cooling mechanism between these components. This enables a more compact mechanical integration of the ERS, comprising less components.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A power conversion mechanism configured to interface between an electric energy store and an electric machine, comprising:
   an electronic switching device comprising a first plurality of power modules and configured to control the direction of current flow between the electric energy store and the electric machine to either a first direction or a second direction opposing the first direction; and
   a first power inverter comprising a second plurality of power modules and configured to commutate the current flow between the electric energy store and the electric machine;
   wherein each power module of the electronic switching device and the first power inverter comprises an identical arrangement of power components; and
   the electronic switching device is arranged as a solid-state relay, with each half of the solid-state relay formed by at least one of the first plurality of power modules, wherein the power module closest to the electric energy store forms a high side of the solid-state relay and the power module closest to the electric machine forms a low side of the solid-state relay,
   wherein a midpoint between at least two power components of the high side of the solid-state relay is used as an input of the electronic switching device, and a midpoint between at least two power components of the low side of the solid-state relay is used as an output of the electronic switching device.

2. A power conversion mechanism as claimed in claim 1, wherein the first power inverter comprises three power modules.

3. A power conversion mechanism as claimed in claim 1, wherein the first plurality of the power modules of the switching device are arranged in a parallel configuration and the second plurality of the power modules of the first power inverter are arranged in a parallel configuration.

4. A power conversion mechanism as claimed in claim 1, the power conversion mechanism further comprising a first power inverter and a second power inverter, wherein the two first power inverter and second power inverter comprise the same configuration of power modules.

5. A power conversion mechanism as claimed in claim 4, wherein the power modules of the power conversion mechanism are arranged into a first row of power modules and a second row of power modules, wherein:
   the first row of power modules comprises the three power modules of the first power inverter and a first power module of the electronic switching device; and
   the second row of power modules comprises three power modules from the second power inverter and a second power module of the electronic switching device.

6. A power conversion mechanism as claimed in claim 1, wherein each power module of the electronic switching device and the first power inverter comprises two power semiconductor switches arranged in a half-bridge configuration.

7. A power conversion mechanism as claimed in claim 6, wherein the power semiconductor switches are either insulated-gate bipolar transistors or metal-oxide-semiconductor field-effect transistors.

8. A power conversion mechanism as claimed in claim 7, wherein each insulated-gate bipolar transistor is placed in an anti-parallel configuration with a corresponding diode.

9. A power conversion mechanism as claimed in claim 8, wherein the arrangement of the power modules and corresponding mutual components is configured in a substantially planar configuration.

10. A power conversion mechanism as claimed in claim 1, further comprising a first driver board, a second driver board and a cooling system configured to interface with one or more power modules;
    wherein both the electronic switching device and the one or more power inverters are electrically coupled to the first driver board, the second driver board and the cooling system.

11. A power conversion mechanism as claimed in claim 10, wherein the power modules of the power conversion mechanism are arranged into two distinct rows of power modules, and wherein a cooling device is arranged horizontally and between the planar surfaces of two adjacent rows of power modules.

12. A power conversion mechanism as claimed in claim 1, wherein one or more power modules comprises a current controlling mechanism configured to control the current supplied to the power module.

13. A power conversion mechanism as claimed in claim 12, wherein the current controlling mechanism comprises a capacitor.

14. A power conversion mechanism as claimed in claim 1, wherein the speed of current passing through the electronic switching device is different when the current is flowing in the first direction to the current flowing in the second direction.

15. A power conversion mechanism as claimed in claim 1, wherein the electronic switching device is further configured to control the polarity of voltage through the electronic switching device between a positive voltage value and a negative voltage value.

16. A power conversion mechanism as claimed in claim 1, wherein the electric machine is a motor generator unit.

17. A power conversion mechanism as claimed in claim 1, wherein the switching device can be opened to electrically isolate the switching device and the first power inverter, and wherein the power conversion mechanism further comprises a controller that is configured to initiate the opening of the switching device upon the detection of an abnormal rate of change of voltage between the switching device and the first power inverter.

18. A power conversion mechanism as claimed in claim 17, wherein the controller is further configured to continue detect the rate of change of voltage over a predefined period of time and (i) if the rate of change of voltage is abnormal, continue the opening of the switching device to fully isolate the electric energy store and the electric machine or (ii) if the rate of change of voltage is allowable, terminate the opening of the switching device to maintain contact between the electric energy store and the electric machine.

19. A power conversion mechanism as claimed in claim 1, wherein the input of the electronic switching device is directly connected to the high side of the solid-state relay and not directly connected to the low side of the solid-state relay.

20. A power conversion mechanism as claimed in claim 19, wherein the output of the electronic switching device is directly connected to the low side of the solid-state relay and not directly connected to the high side of the solid-state relay.

21. A power conversion mechanism as claimed in claim 1, wherein the electronic switching device is configured to connect and disconnect the electric energy store and electric machine.

22. A vehicle comprising an electric energy store, mechanism configured to interface an electric energy store and a power conversion mechanism configured to interface the electric energy store and the electric machine, wherein the power conversion mechanism comprises:

an electronic switching device comprising a first plurality of power modules and configured to control the direction of current flow between the electric energy store and the electric machine to either a first direction or a second direction opposing the first direction; and a first power inverter comprising a second plurality of power modules and configured to commutate the current flow between the electric energy store and the electric machine;

wherein each power module of the electronic switching device and the first power inverter comprises an identical arrangement of power components; and the electronic switching device is arranged as a solid-state relay, with each half of the solid-state relay formed by at least one of the first plurality of power modules, wherein the power module closest to the electric energy store forms a high side of the solid-state relay and the power module closest to the electric machine forms a low side of the solid-state relay, wherein a midpoint between at least two power components of the high side of the solid-state relay is used as an input of the electronic switching device, and a midpoint between at least two power components of the low side of the solid-state relay is used as an output of the electronic switching device.

* * * * *

UNITED STATES PATENT AND TRADEMARK OFFICE
CERTIFICATE OF CORRECTION

PATENT NO. : 12,172,527 B2
APPLICATION NO. : 17/295807
DATED : December 24, 2024
INVENTOR(S) : Luis Manuel De Sousa, Georgios C. Christidis and Anastasios Nanakos It is certified that error appears in the above-identified patent and that said Letters Patent is hereby corrected as shown below:

In the Claims

Claim 4
Column 9, Lines 49-50, alter "comprising" delete "a first power inverter and".
Column 9, Line 50, after "the" delete "two".

Claim 5
Column 9, Line 57, after "comprises" delete "the".

Claim 9
Column 10, Line 9, after "wherein" delete "the".

Claim 14
Column 10, Line 35, after "wherein" delete "the".

Signed and Sealed this
Fourth Day of March, 2025

Coke Morgan Stewart
*Acting Director of the United States Patent and Trademark Office*